Figure 1:
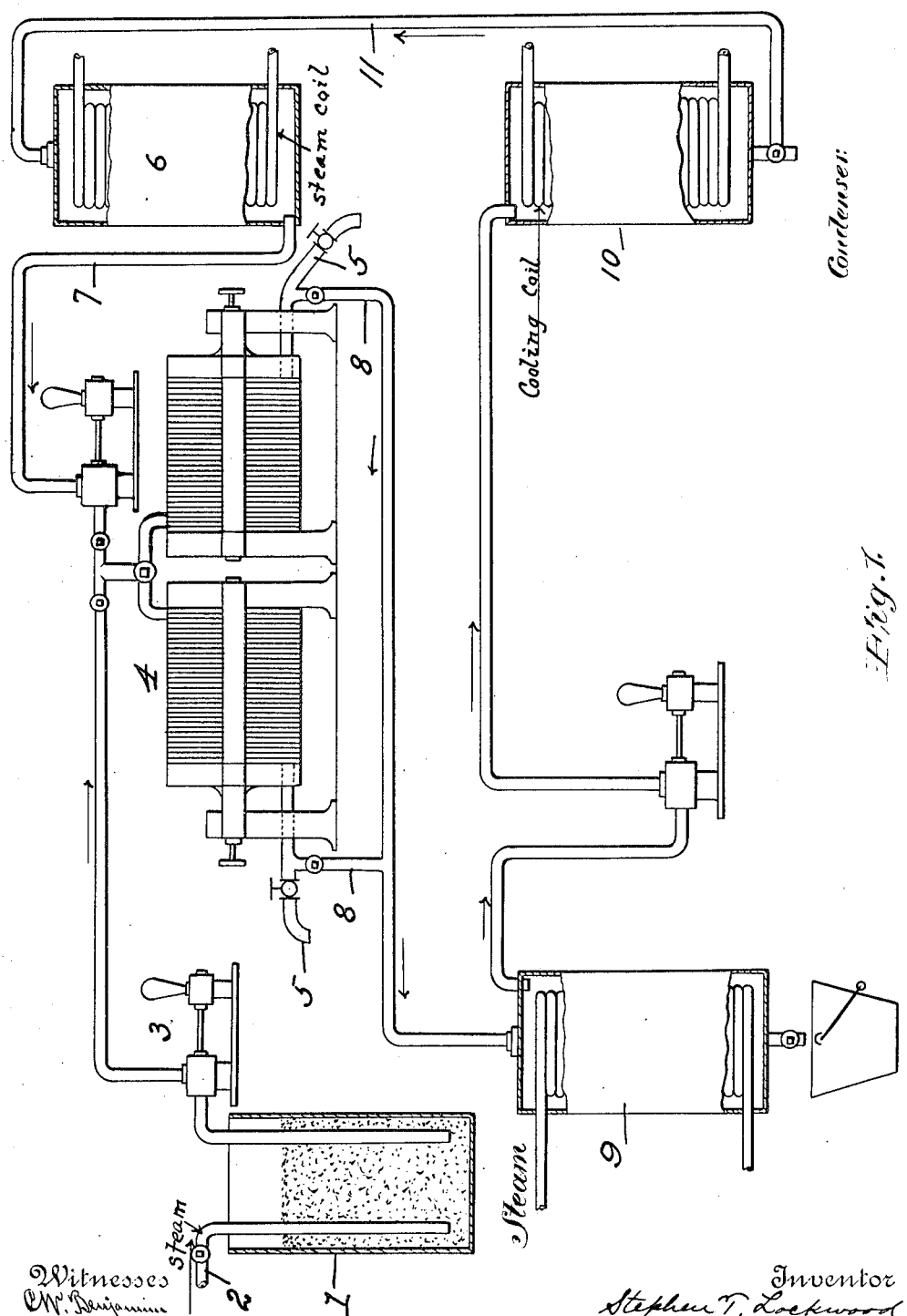

No. 852,441. PATENTED MAY 7, 1907.
S. T. LOCKWOOD.
PROCESS OF REFINING LARD AND RECOVERING WASTE LARD FROM SPENT FULLERS' EARTH.
APPLICATION FILED JAN. 8, 1906.

2 SHEETS—SHEET 1.

Witnesses
Inventor
Stephen T. Lockwood
By his Attorneys
Davis & Davis

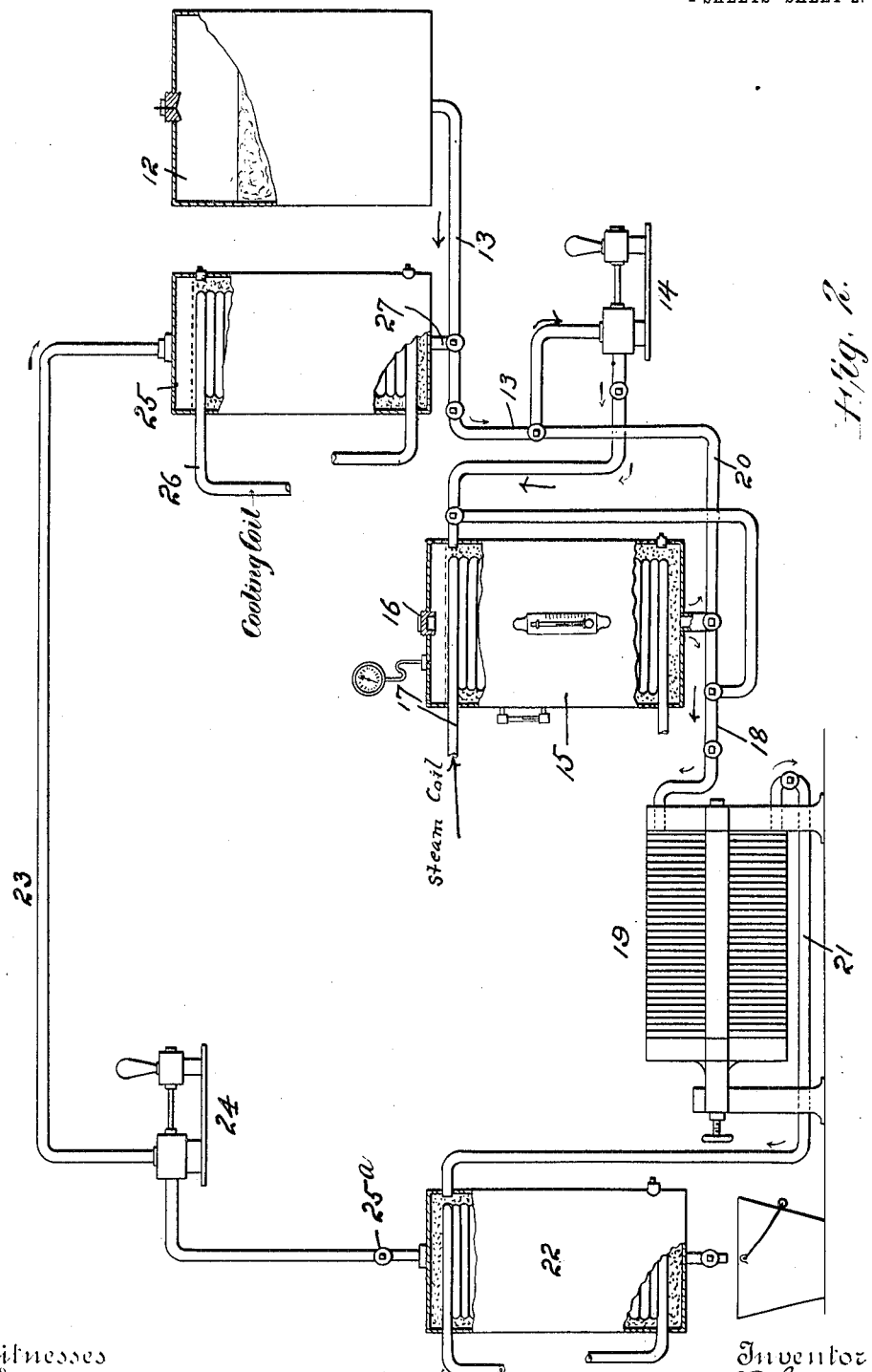

UNITED STATES PATENT OFFICE.

STEPHEN T. LOCKWOOD, OF BUFFALO, NEW YORK.

PROCESS OF REFINING LARD AND RECOVERING WASTE LARD FROM SPENT FULLERS' EARTH.

No. 852,441.     Specification of Letters Patent.     Patented May 7, 1907.

Application filed January 8, 1906. Serial No. 294,993.

*To all whom it may concern:*

Be it known that I, STEPHEN T. LOCKWOOD, a citizen of the United States, residing in the city of Buffalo, county of Erie and State of New York, have invented certain new and useful Improvements in Processes of Refining Lard and Recovering Waste Lard from Spent Fullers' Earth, of which the following is a specification, reference being had therein to the accompanying drawings, in which—

Figure 1 represents a diagrammatic view of an apparatus for carrying out the process, and Fig. 2 a diagrammatic view of a slightly different form of apparatus for carrying out the process.

In the ordinary method or process of lard purification the lard is mixed with fuller's earth and is then heated in a suitable tank or receptacle to fluidity, with live steam. This fluid mixture is pumped into a filter-press by means of which the fuller's earth is gathered in cakes in the cloths of the press while the purified lard is discharged through the outlets. The cakes of fuller's earth, when removed from the filter-press are, in weight, about $12\frac{1}{2}$ per cent. lard, which lard, heretofore, was lost; and the fuller's earth containing such lard was unfit for further use by reason of such lard content.

It is the main object of this invention to recover this lost material, and at the same time to regenerate the spent fuller's earth to such an extent that it may be again used in the purifying process. I accomplish this preferably by the use of the solvent known as carbon tetrachlorid but, of course I may make use of any other solvent having practically the same chemical properties in the same proportions, the same being used as hereinafter described.

Referring to the various parts illustrated in Fig. 1 of the drawing, 1 designates a suitable tank into which the lard and fuller's earth are introduced and heated by means of live steam which enters said vat through the pipe 2. I may heat this mixture by any other suitable means. The fluid mixture is pumped by means of the pump 3 from said tank to the filter-press 4. By means of this press the purified lard is forced from the fuller's earth and passes from said press through the outlet 5. The fuller's earth is retained in the press, cakes thereof being formed between the cloths of the press.

When the press has been operated to its fullest extent and cakes of fuller's earth are formed therein, carbon tetrachlorid is forced into the press from a tank 6 through pipe 7. A suitable pressure is maintained on the liquid by a pump or other means whereby the solvent may be forced through the cakes in the filter-press under the proper pressure. The solvent containing the lard in solution passes from the press through the outlets therefrom and into pipe 8 which leads said solution to a distilling apparatus 9. In this apparatus the carbon tetrachlorid is vaporized, leaving the purified lard therein. The carbon tetrachlorid vapor is condensed in the condenser 10 and is then passed back into the tank 6 through pipe 11. When all of the recoverable lard has been dissolved from the cakes of fuller's earth in the press, the flow of carbon tetrachlorid to the press is shut off and the cakes of fuller's earth removed from the press. When these cakes are dried and pulverized they may be used again in the tank 1 as said earth has been practically regenerated or returned to its original condition and given again its peculiar property of absorbing lard or other grease. The lard remaining in the apparatus 9 may be drawn therefrom in any suitable manner and will be found to be very pure and clean.

While it is convenient to recover the lard from the cakes of fuller's earth without removing said cakes from the filter-press, this method may in some cases be too slow. Instead therefore, of passing the tetrachlorid through the cakes in the filter-press said cakes may be removed from the press and broken or pulverized and mixed with tetrachlorid in a suitable tank and then the mixture passed through a filter-press to separate the solvent from the fuller's earth. In Fig. 2 of the drawings I have shown a diagrammatic view of an apparatus for carrying out my invention in this manner. Referring to the parts illustrated by this view, 12 designates a tank adapted to contain a supply of carbon tetrachlorid which is connected by a pipe 13 to a small pump 14. This pump delivers the liquid into a mixing tank 15. The cakes of spent fuller's earth containing the lard are removed from the filter-press and are preferably broken or pulverized, and placed in the tank 15 and thoroughly mixed with the tetrachlorid therein, said fuller's earth being charged into said tank through an opening in its top which is closed by the plug 16. Within said tank is arranged a steam coil 17 by which the mixture of tetrachlorid and spent fuller's earth may be heated to the desired temperature, which is approximately 78 degrees centigrade (172.4 F.). This tank is to be provided with a pressure gage, thermometer, and gage glass, so that the exact condition of the contents of the tank may be learned at any time. The bottom of this tank is connected by means of a pipe 18 to the intake of the filter-press 19, and by a pipe 20 to the pump 14 and pipe 13. The outlet from the filter-press is connected by pipe 21 to a distilling apparatus 22. The pump 14 forces the mixture of fuller's earth and tetrachlorid into the filter-press, the cloths therein catching and retaining the fuller's earth and permitting the lard to pass with the tetrachlorid into the outlet pipe 21 and to the still 22. The vapors from said still are forced into pipe 23 by means of a small pump 24 which is connected to the upper end of the still and serves to draw the vapors therefrom. A check valve 25$^a$ is arranged between said pump and still which permits the vapors to pass from the still, but will prevent them passing back. The pipe 23 carries the tetrachlorid vapor into the condensing tank 25 which contains the condensing coil 26, suitable cooling liquid or other cooling medium being passed through said coil. The condensed tetrachlorid is led back into pipe 13 through pipe 27, as shown clearly in Fig. 2 of the drawings. This apparatus constitutes a means for rapidly recovering lard from what heretofore was considered a waste product, and regenerates the fuller's earth so that it may be again used in tank 1.

I have found that an amount of lard equal to 11½ per cent of the weight of the cakes may be recovered by this process from the cakes of fuller's earth, and that said lard is clear and pure.

The great advantage of this invention will be readily appreciated when it is understood that there are tons of spent fuller's earth, 12½ per cent of the weight of which is lard, wasted every day in plants for refining lard, and that the recoverable lard contents of said fuller's earth are worth about 12 cents a pound. The advantage of this invention will be further appreciated when it is understood that this refined or cleaned fuller's earth is in all respects the same as new fuller's earth costing $15.00 a ton.

Carbon tetrachlorid, sometimes called "chloro-carbon", sometimes "tetrachloromethane", has the [chemical formula $CCl_4$. It is a heavy, stable, colorless, transparent, liquid compound, insoluble in water; soluble in alcohol and in ether; specific gravity 1.56 (1.60); boils at 78° cent. (172.4° F.).

While I have described my invention as applied to refining and recovering waste lard, I desire it understood that the process may be used in refining and recovering waste tallow and other fats and grease. It will, of course, be understood, that I do not wish to be limited to the solvent known as carbon tetrachlorid, and I reserve the right to use any similar chemical or chemical combination having the same chemical properties which, when used in a similar manner, will produce the same results.

It will of course, be understood, that the apparatus illustrated will be provided with suitable check valves and way-valves to secure the proper operation thereof.

The type of filter-press used in this process is known as the closed type, and I prefer to use the Perrin closed press so that the apparatus is entirely closed and the tetrachlorid is not exposed to the atmosphere during the entire operation.

The matter shown and described herein, but not claimed, forms the subject matter of a divisional application.

Having thus described my invention, what I claim as new and desire to secure by Letters Patent, is

1. The process of refining lard consisting in subjecting lard in combination with fuller's earth to tetrachlorid, and heat to dissolve the lard and separate the tetrachlorid and lard solution from the fuller's earth, distilling the tetrachlorid and lard solution to deposit the lard.

2. The process or refining lard consisting in mixing lard with fuller's earth, heating the same, forcing said heated mixture through a filter press whereby the fuller's earth is retained in cakes in said press, breaking or pulverizing said cakes of fuller's earth, placing said pulverized spent fuller's earth in a tank with carbon tetrachlorid, heating the same to fluidity, delivering the mixture to a filter press, whereby the fuller's earth will be separated from the tetrachlorid and lard solution and will be formed into cakes in the press, distilling the tetrachlorid and lard solution to vaporize the tetrachlorid and deposit the lard.

3. The process of refining lard and recovering waste fuller's earth consisting in mixing lard and fuller's earth, heating the same, running said heated mixture through a filter press whereby the fuller's earth is retained in cakes in said press, placing said cakes of fuller's earth in a tank with tetrachlorid, heating the same and then delivering the mixture of fuller's earth and the tetrachlorid to a filter press, whereby the earth will be separated from the tetrachlorid and lard solution, and then distilling the solvent to deposit the lard.

4. The process of refining lard consisting in mixing lard with fuller's earth, heating the same, forcing said heated mixture through a filter press whereby the fuller's earth is formed into cakes in said press, breaking or pulverizing said cakes of fuller's earth and placing said pulverized spent fuller's earth in a tank with the tetrachlorid, delivering the mixture to a filter press whereby the fuller's earth will be separated from the tetrachlorid and lard solution and will be formed into cakes in the press, and then distilling the tetrachlorid and lard solution to vaporize the tetrachlorid and deposit the lard.

5. The process of refining and recovering waste grease or lard or similar material from spent fuller's earth containing such material, consisting in placing said spent fuller's earth in a tank with tetrachlorid and thoroughly mixing the same, subjecting the mixture to heat, delivering the heated mixture to a filter press, whereby the fuller's earth will be separated from the tetrachlorid and grease or lard solution and will be formed into cakes in the press, and then distilling the tetrachlorid to deposit the recovered grease or lard.

6. The process of refining and recovering waste grease or lard or similar material from spent fuller's earth containing such material, consisting in placing said spent fuller's earth in a tank with tetrachlorid and thoroughly mixing the same, delivering the mixture to a filter press, whereby the fuller's earth will be separated from the tetrachlorid and grease or lard solution and will be formed into cakes in the press, and then distilling the tetrachlorid to deposit the recovered grease or lard.

In testimony whereof I hereunto affix my signature in the presence of two witnesses this 5th day of January 1906.

STEPHEN T. LOCKWOOD.

Witnesses:
  MERTON S. GIBBS,
  WILLIAM A. GERECKE.